United States Patent
Sawa et al.

(10) Patent No.: US 10,202,134 B2
(45) Date of Patent: Feb. 12, 2019

(54) TRAIN INFORMATION MANAGING APPARATUS

(71) Applicant: MITSUBISHI ELECTRIC CORPORATION, Chiyoda-ku, Tokyo (JP)

(72) Inventors: Takuya Sawa, Tokyo (JP); Tomoaki Ikejima, Tokyo (JP); Tetsuo Komura, Tokyo (JP); Shogo Tatsumi, Tokyo (JP); Shingo Honda, Tokyo (JP); Takashi Miyauchi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 128 days.

(21) Appl. No.: 15/124,621

(22) PCT Filed: Mar. 11, 2014

(86) PCT No.: PCT/JP2014/056369
§ 371 (c)(1),
(2) Date: Sep. 8, 2016

(87) PCT Pub. No.: WO2015/136628
PCT Pub. Date: Sep. 17, 2015

(65) Prior Publication Data
US 2017/0015338 A1    Jan. 19, 2017

(51) Int. Cl.
*B61L 27/04*    (2006.01)
*B60L 15/42*    (2006.01)
(Continued)

(52) U.S. Cl.
CPC .............. *B61L 27/04* (2013.01); *B60L 1/003* (2013.01); *B60L 3/0084* (2013.01); *B60L 15/42* (2013.01);
(Continued)

(58) Field of Classification Search
CPC .......... B61L 27/00; B61L 27/02; B61L 27/04; B61L 7/088; B61L 23/22; B61C 15/00; B61C 15/12; B61C 15/14
See application file for complete search history.

(56) References Cited

U.S. PATENT DOCUMENTS 7,577,688 B2    8/2009    Sato et al.

FOREIGN PATENT DOCUMENTS

JP    63-142741 A    6/1988
JP    3-117062 A    5/1991
(Continued)

OTHER PUBLICATIONS

International Search Report (PCT/ISA/210) dated Jun. 17, 2014, by the Japanese Patent Office as the International Searching Authority for International Application No. PCT/JP2014/056369.
(Continued)

*Primary Examiner* — Robert J McCarry, Jr.
(74) *Attorney, Agent, or Firm* — Buchanan Ingersoll & Rooney PC

(57) ABSTRACT

A train information managing apparatus according to the present invention includes: a terminal apparatus that communicates with a train-mounted device; and a central apparatus that communicates with the terminal apparatus and the train-mounted device. In at least one of the terminal apparatus and the central apparatus, a processing system that includes a signal processing unit is duplicated, the signal processing unit generating a command signal for the train-mounted device and receiving a response signal made in response to the command signal, and at least one of the signal processing units that receive a response signal from the train-mounted device transmits, to another of the signal
(Continued)

processing units, information indicating receipt of the response signal so as to be used to determine a failure in one of the processing systems.

6 Claims, 5 Drawing Sheets

(51) Int. Cl.
  *B60L 1/00* (2006.01)
  *B60L 3/00* (2006.01)
(52) U.S. Cl.
  CPC ....... *B60L 2200/26* (2013.01); *B60L 2240/34* (2013.01); *B60L 2240/36* (2013.01); *B60L 2250/16* (2013.01); *B61L 2210/00* (2013.01); *Y02T 90/16* (2013.01)

(56) References Cited

FOREIGN PATENT DOCUMENTS

| JP | 4-213947 A | 8/1992 | |
|----|----|----|----|
| JP | 05038005 A | 2/1993 | |
| JP | 2000-224204 A | 8/2000 | |
| JP | 2002-247142 A | 8/2002 | |
| JP | 2004-40537 A | 2/2004 | |
| JP | 2004-172943 A | 6/2004 | |
| JP | 2005-27368 A | 1/2005 | |
| JP | 2006-149142 A | 6/2006 | |
| JP | 2006149142 | * 6/2006 | ............ B60L 15/42 |
| JP | 2009-201334 A | 9/2009 | |
| JP | 2009-278352 A | 11/2009 | |

OTHER PUBLICATIONS

Written Opinion (PCT/ISA/237) dated Jun. 17, 2014, by the Japanese Patent Office as the International Searching Authority for International Application No. PCT/JP2014/056369.

Office Action (Notice of Rejection) dated Jul. 28, 2016 issued in the corresponding Japanese Patent Application No. 2016-507170 (English Translation only).

Extended European Search Report dated Jul. 27, 2017, issued by the European Patent Office in corresponding European Application No. 14885455.7. (7 pages).

Office Action (Communication pursuant to Article 94(3) EPC) dated Jul. 10, 2018, by the European Patent Office in corresponding European Patent Application No. 14885455.7. (7 pages).

* cited by examiner

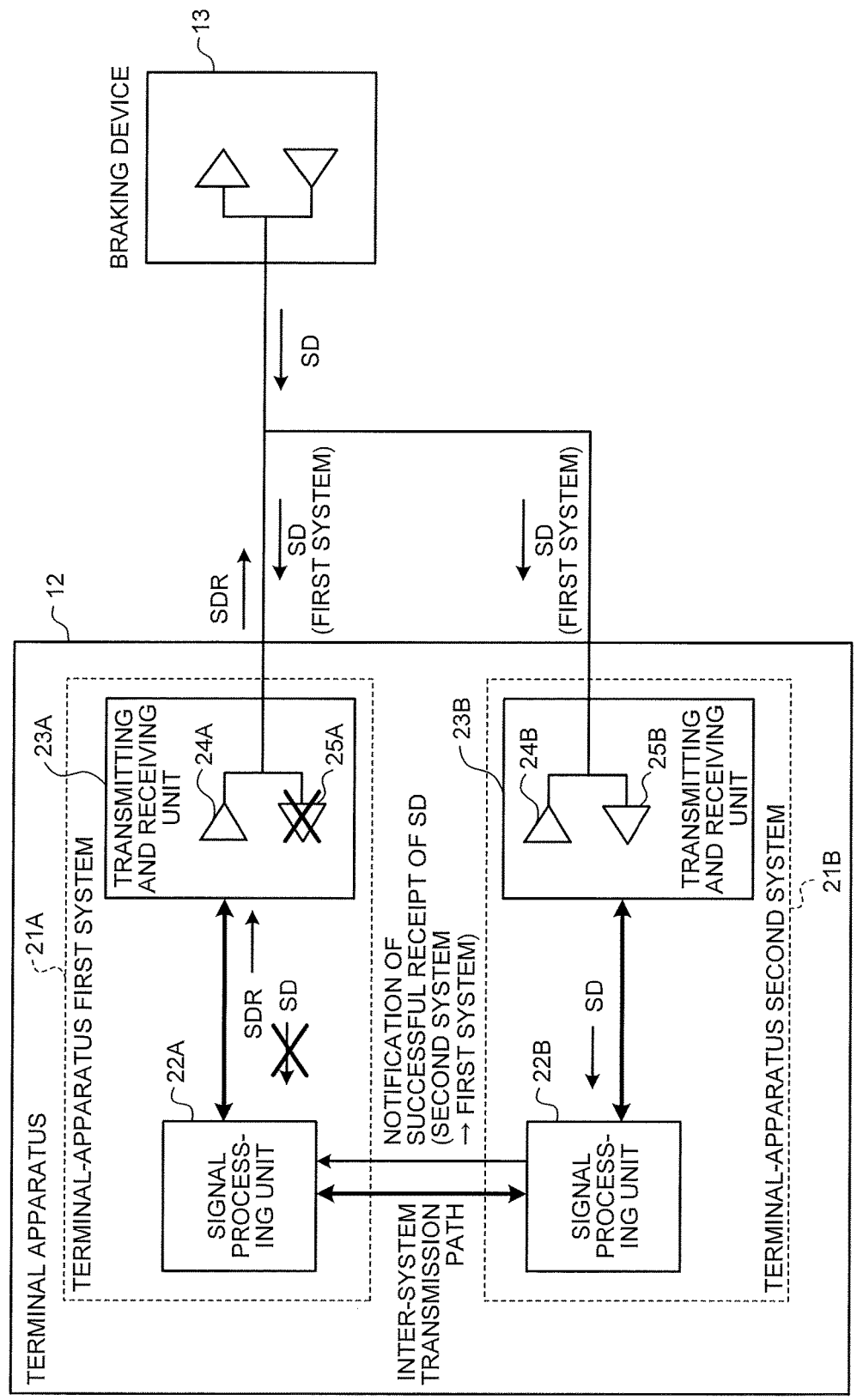

TRAIN INFORMATION MANAGING APPARATUS

FIELD

The present invention relates to a train information managing apparatus that manages a train-mounted device.

BACKGROUND

Trains that have recently been brought into service are often equipped with a train information managing apparatus. The train information managing apparatus monitors the operational state of train-mounted devices and controls the operation of each device so that the trains run more comfortably and efficiently and quick recovery can be achieved in the event of a failure occurring in the equipment. The train information managing apparatus is principally composed of a central apparatus and a terminal apparatus. The operational state information output from each device is transmitted to the central apparatus via the terminal apparatus and the central apparatus typically manages and controls the devices on the basis of the operational state information. A control command signal transmitted from the central apparatus to each device, for example, includes device specific data for individually controlling the operation of each device. Devices that have received a control command signal operate in accordance with the device specific data, thereby providing an efficient train service.

In order to improve the reliability of the train information managing apparatus, a train information managing apparatus has been proposed that has a configuration in which the terminal apparatus is duplexed (for example, Patent Literature 1). With the invention described in Patent Literature 1, the duplicated circuits of the systems mutually monitor each other's operations. When the second system operating as a slave detects an abnormality in the first system operating as a master, the second system starts outputting command signals to the device to be controlled (i.e., starts operating as a master) and notifies the first system of the detection of the abnormality. Upon receiving the notification of the detection of the abnormality, the first system stops outputting command signals to the device to be controlled.

CITATION LIST

Patent Literature

Patent Literature 1: Japanese Patent Application Laid-open No. 2009-201334

SUMMARY

Technical Problem

However, with the invention described in Patent Literature 1, because the systems monitor each other's command signals that are generated therein and output therefrom, although each system can detect the occurrence of an abnormality in a transmission operation, each system cannot detect the occurrence of an abnormality in a reception operation (abnormality in an operation of receiving a response signal in response to a command signal). Consequently, there is a problem in that each system cannot switch its operation (i.e., the system operating as a slave cannot start operating as a master).

The present invention has been achieved in view of the above and an object of the present invention is to provide a train information managing apparatus that enhances reliability when compared with conventional technologies.

Solution to Problem

In order to solve the above problems and achieve the object, an aspect of the present invention a train information managing apparatus including: a terminal apparatus that communicates with a train-mounted device; and a central apparatus that communicates with the terminal apparatus and the train-mounted device, wherein in at least one of the terminal apparatus and the central apparatus, a processing system that includes a signal processing unit is duplicated, the signal processing unit generating a command signal for the train-mounted device and receiving a response signal made in response to the command signal, and at least one of the signal processing units that receive a response signal from the train-mounted device transmits, to another of the signal processing units, information indicating receipt of the response signal so as to be used to determine a failure in one of the processing systems.

Advantageous Effects of Invention

According to the present invention, an effect is obtained where a train information managing apparatus with improved reliability can be realized.

BRIEF DESCRIPTION OF DRAWINGS

FIG. 5 is a diagram illustrating an example operation of the terminal apparatus.

DESCRIPTION OF EMBODIMENTS

Exemplary embodiments of a train information managing apparatus according to the present invention will be explained below in detail with reference to the drawings. This invention is not limited to the embodiments.

Embodiment.

Figure 1:
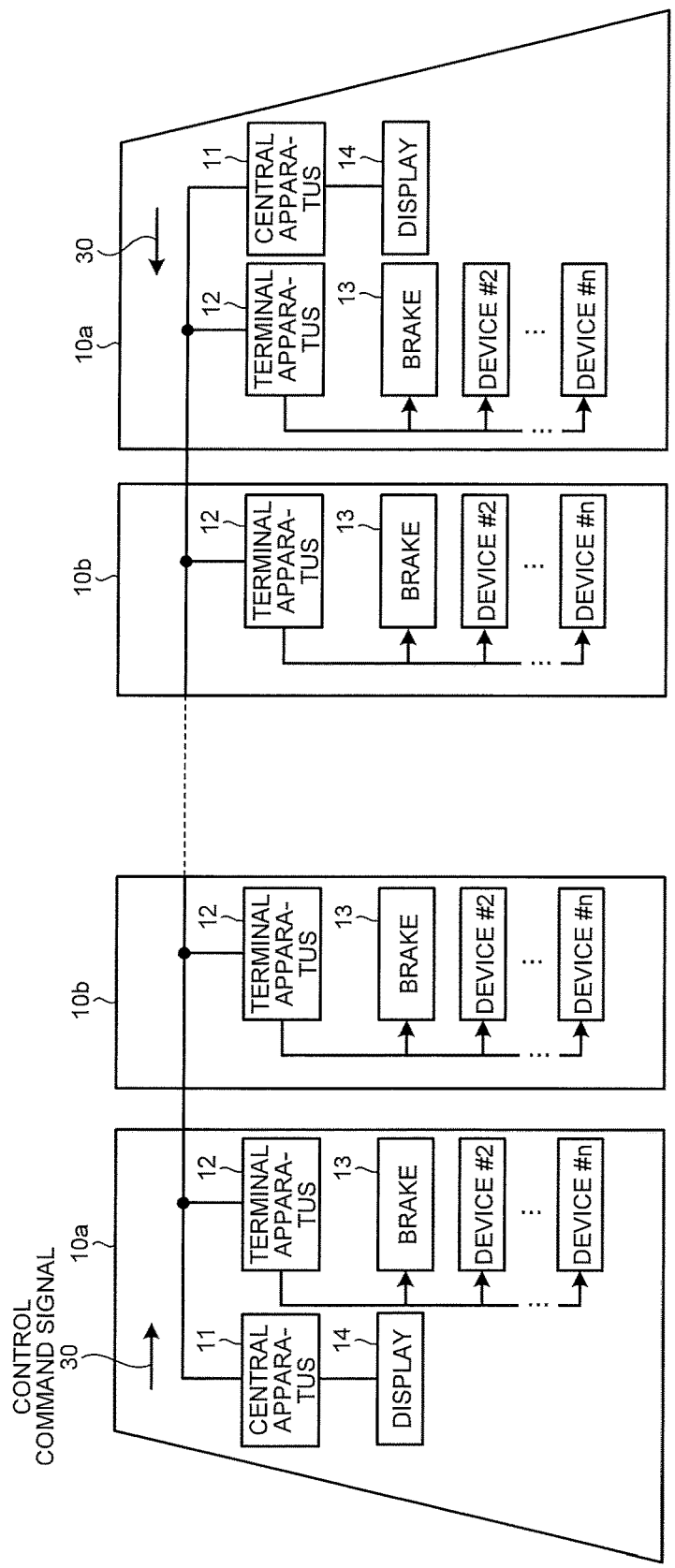
FIG. 1 is a diagram illustrating an example configuration of a train information managing apparatus according to the present invention.

FIG. 1 is a diagram illustrating an example configuration of a train information managing apparatus according to the present invention.

The train information managing apparatus includes central apparatuses 11 and displays 14, which are mounted on head cars 10a at both ends of the train consist; and terminal apparatuses 12, which are mounted on the head cars 10a and intermediate cars 10b. Train-mounted devices (hereinafter, simply referred to as "devices), which include a braking device 13, are installed in each car.

The central apparatuses 11 are connected to a control operation apparatus, such as a master controller (not illustrated), and perform a process of inputting and outputting train information, such as train identification information, train location information, train operation information, and train command information. Although not illustrated, a safety apparatus, a broadcasting and communication apparatus, and a ground-to-train information transmitting and receiving apparatus, for example, are also connected to the central apparatuses 11.

The terminal apparatus 12 transmits, to each device (brake as a device #1 and devices #2 to #n), data including control information and the like output from each of the central apparatuses 11. Moreover, the terminal apparatus 12 collects data output from each of the devices #1 to #n and transmits the data to each of the central apparatuses 11. In such a manner, the terminal apparatuses 12 collect and share the train information in conjunction with each other. The data output from each of the devices #1 to #n includes information indicative of the destination (the central apparatuses 11) of the data; a device ID for identifying a transmission source device; and operational state information (for example, the current air conditioning temperature and an output from a VVVF) on the devices #1 to #n; therefore, the central apparatuses 11 that have received the data from each of the devices #1 to #n can identify which device has transmitted the operational state information. The terminal apparatuses 12 in some cases autonomously collect data from each device, for example, at a predefined timing regardless of whether the control information has been received from the central apparatuses 11.

An operation of the train information managing apparatus will be briefly explained with reference to FIG. 1. The central apparatuses 11 output, to each of the terminal apparatuses 12, data (hereinafter, referred to as a "control command signal 30") that includes device specific data (control data) for controlling the operation of each of the devices #1 to #n and other data. The terminal apparatuses 12 that have received the control command signal 30 transfer the control command signal 30 to the devices connected thereto, and each of the devices #1 to #n that have received the control command signal 30 performs an operation in accordance with the device specific data included in the control command signal 30. The central apparatuses 11 also output the control command signal 30 to devices (not illustrated) to which they are directly connected.

The data that includes the operational state information and is output from each of the devices #1 to #n is collected by each of the terminal apparatuses 12 and is transmitted to the central apparatuses 11. The central apparatuses 11 also collect data output from devices (not illustrated) to which they are directly connected. The central apparatuses 11 that have received data from each of the devices #1 to #n and the devices to which they are connected record the data and output, to the displays 14 installed in the cab or the like, the operational state information and the like. Consequently, information necessary for the train service is displayed on the displays 14.

Figure 2:
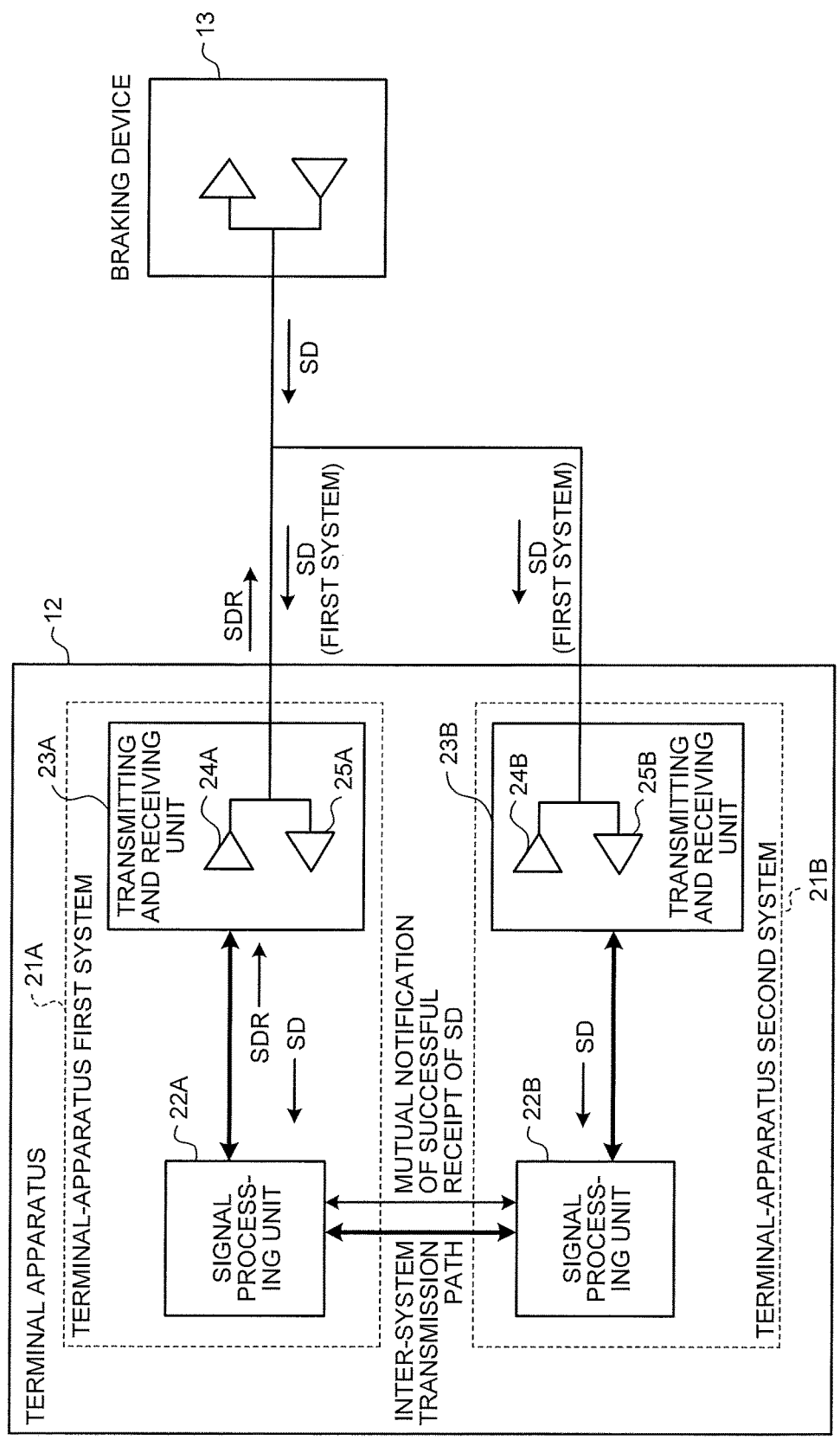
FIG. 2 is a diagram illustrating an example configuration of the terminal apparatus.

Next, the terminal apparatus 12 of the train information managing apparatus will be explained in detail. FIG. 2 is a diagram illustrating an example configuration of the terminal apparatus 12. In FIG. 2, the braking device 13 is illustrated as an example of a device to be controlled by the train information managing apparatus. As illustrated in FIG. 2, the terminal apparatus 12 includes a terminal-apparatus first system 21A and a terminal-apparatus second system 21B, which are two systems with an identical internal configuration. The input side and output side of each system are connected to the same transmission path, and signals from the central apparatus 11 and signals from the brake device are received by both systems. One of the terminal-apparatus first system 21A and the terminal-apparatus second system 21B operates as a master (active system) and the other one of the terminal-apparatus first system 21A and the terminal-apparatus second system 21B operates as a slave (auxiliary system). The system operating as a master generates an output signal output to the braking device 13 and an output signal output to the central apparatus 11. The terminal-apparatus first system 21A includes a signal processing unit 22A and a transmitting and receiving unit 23A, and the transmitting and receiving unit 23A includes a transmitting unit 24A and a receiving unit 25A. The terminal-apparatus second system 21B includes a signal processing unit 22B and a transmitting and receiving unit 23B, and the transmitting and receiving unit 23B includes a transmitting unit 24B and a receiving unit 25B. The signal processing unit 22A and the signal processing unit 22B can communicate with each other via an inter-system transmission path.

In such a manner, the terminal apparatus 12 according to the present embodiment employs a redundant configuration in order to improve the reliability. In the present embodiment, an explanation will be given, as an example, of an example configuration and operations in a case where the terminal apparatus 12 has redundancy. The central apparatus 11 can have redundancy in a similar manner.

Next, a basic operation of the terminal-apparatus first system 21A and the terminal-apparatus second system 21B will be explained. Because the terminal-apparatus first system 21A and the terminal-apparatus second system 21B have an identical configuration, the operation of each unit of the terminal-apparatus first system 21A will be explained for each of a case where the terminal-apparatus first system 21A operates as a master and a case where the terminal-apparatus first system 21A operates as a slave.

(Operation of Each Unit When the Terminal-Apparatus First System 21A Operates as a Master)

When the terminal-apparatus first system 21A is operating as a master, the signal processing unit 22A generates a state-data request signal SDR at a predetermined timing and outputs the SDR to the braking device 13 via the transmitting and receiving unit 23A. The signal processing unit 22A receives a state-data signal SD in response to the SDR. The signal processing unit 22A then notifies, via the inter-system transmission path, the signal processing unit 22B of the fact that the SD has been received from the braking device 13. The signal processing unit 22A may transmit, to the signal processing unit 22B, the SD (copy) received from the braking device 13 via the inter-system transmission path without notifying the signal processing unit 22B of the receipt of the SD. For example, when there is a request from the central apparatus 11 for the SD received from the braking device 13 via the transmitting and receiving unit 23A (or data generated on the basis of the SD), the SD is transmitted to the central apparatus 11.

Moreover, the signal processing unit 22A performs a failure detection on the receiving unit 25A in the transmitting and receiving unit 23A on the basis of the signal (a notification of the receipt of the SD or the SD that the terminal-apparatus second system 21B has received from the braking device 13) received from the signal processing unit 22B of the terminal-apparatus second system 21B via the inter-system transmission path.

The transmitting and receiving unit 23A includes the transmitting unit 24A and the receiving unit 25A. When the transmitting and receiving unit 23A receives the SDR from the signal processing unit 22A, the transmitting and receiving unit 23A transmits the SDR to the braking device 13. When the transmitting and receiving unit 23A receives, from the braking device 13, the SD that is a response signal made in response to the SDR, the transmitting and receiving unit 23A outputs the SD to the signal processing unit 22A.

(Operation of Each Unit When the Terminal-Apparatus First System 21A Operates as a Slave)

When the terminal-apparatus first system 21A is operating as a slave, the signal processing unit 22A does not generate and output a state-data request signal SDR. However, when the signal processing unit 22A receives, via the transmitting and receiving unit 23A, an SD that is made in response to the SDR transmitted by the terminal-apparatus second system 21B operating as a master, the signal processing unit 22A notifies, via the inter-system transmission path, the signal processing unit 22B of the receipt of the SD (the signal processing unit 22A may transmit a copy of the received SD to the signal processing unit 22B via the inter-system transmission path instead of notifying the signal processing unit 22B of the receipt of the SD).

Moreover, the signal processing unit 22A performs a failure detection on the receiving unit 25A in the transmitting and receiving unit 23A on the basis of the signal (a notification of the receipt of the SD or the SD that the terminal-apparatus second system 21B has received from the braking device 13) received from the signal processing unit 22B of the terminal-apparatus second system 21B via the inter-system transmission path.

The transmitting and receiving unit 23A performs a reception operation of the SD that is made in response to the SDR transmitted from the terminal-apparatus second system 21B operating as a master. When the transmitting and receiving unit 23A receives the SD, the transmitting and receiving unit 23A sends the SD to the signal processing unit 22A.

Figure 3:
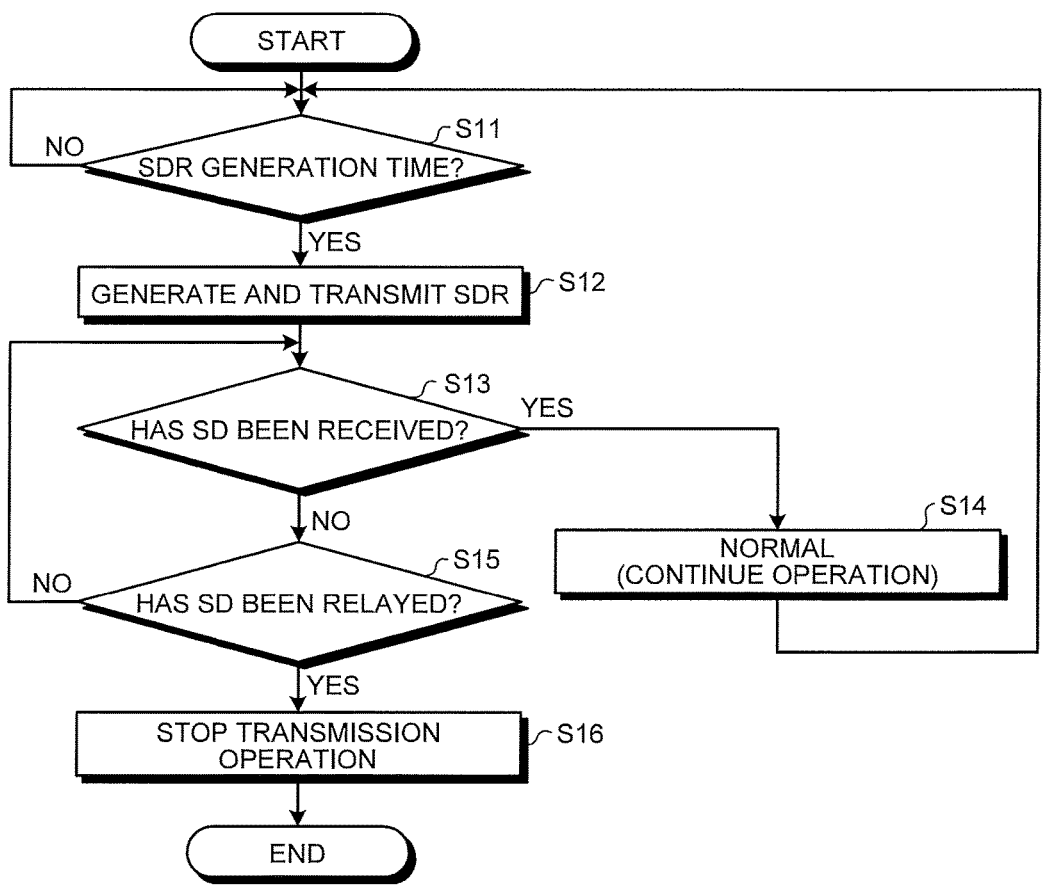
FIG. 3 is a flowchart illustrating an operation of a system operating as a master.
Figure 4:
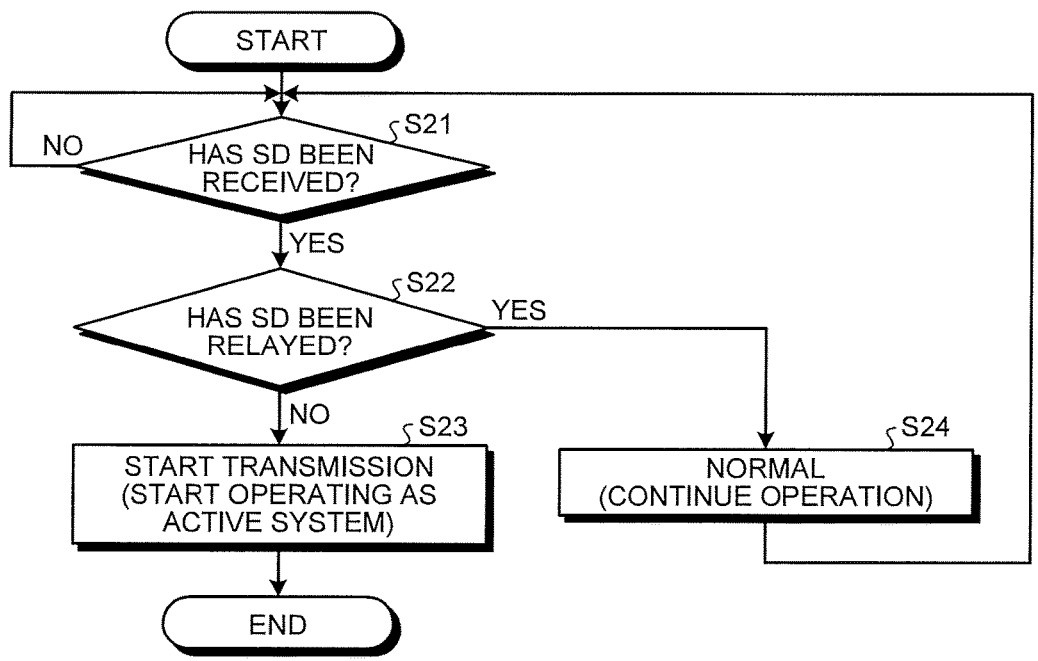
FIG. 4 is a flowchart illustrating an operation of a system operating as a slave.

Next, an explanation will be given in detail of an operation of the terminal apparatus 12 according to the present embodiment with reference to FIG. 3 to FIG. 5. FIG. 3 is a flowchart illustrating an operation of the terminal-apparatus first system 21A or the terminal-apparatus second system 21B, whichever is operating as a master, and FIG. 4 is a flowchart illustrating an operation of the system operating as a slave. FIG. 5 is a diagram illustrating an example operation of the terminal apparatus 12. In the present embodiment, an explanation will be given of an example operation in a state where the terminal-apparatus first system 21A is set as a master and the terminal-apparatus second system 21B is set as a slave.

The terminal-apparatus first system 21A that is operating as a master in the terminal apparatus 12 operates in accordance with FIG. 3. Specifically, the signal processing unit 22A of the terminal-apparatus first system 21A monitors whether it is time to generate an SDR. When it is time to generate an SDR (Yes at Step S11), the signal processing unit 22A generates the SDR and transmits the SDR to the braking device 13 via the transmitting and receiving unit 23A (Step S12). Next, the signal processing unit 22A checks whether an SD that is made in response to the SDR has been received from the braking device 13 via the transmitting and receiving unit 23A (Step S13). When the SD has been received (Yes at Step S13), the signal processing unit 22A determines that an operation is performed normally and continues its operation (Step S14). Specifically, the signal processing unit 22A notifies the terminal-apparatus second system 21B (the signal processing unit 22B) that is operating as a slave of the fact that the SD has been received and returns to Step S11 to wait for the next time an SDR is generated. When the signal processing unit 22A that has stored the received SD receives a request for the SD (or data generated on the basis of the SD) from the central apparatus 11, the signal processing unit 22A transmits, to the central apparatus 11, the data according to the request content. When the signal processing unit 22A does not receive the SD (No at Step S13), the signal processing unit 22A checks whether the SD has been relayed from the terminal-apparatus second system 21B (the signal processing unit 22B) that is operating as a slave (Step S15). When no SD has been relayed from the terminal-apparatus second system 21B (No at Step S15), the signal processing unit 22A returns to Step S13 to check whether an SD has been received. When the SD has been relayed from the terminal-apparatus second system 21B (Yes at Step S15), i.e., when, as illustrated in FIG. 5, the signal processing unit 22A has received the SD from the terminal-apparatus second system 21B in a state where the signal processing unit 22A cannot receive the SD from the braking device 13, the signal processing unit 22A determines that the receiving unit 25A of the transmitting and receiving unit 23A has failed and stops generation and transmission of an SDR (Step S16). In other words, the terminal-apparatus first system 21A stops operating as a master.

The terminal-apparatus second system 21B operating as a slave in the terminal apparatus 12 operates in accordance with FIG. 4. Specifically, the signal processing unit 22B of the terminal-apparatus second system 21B monitors whether the SD transmitted from the braking device 13 has been received via the transmitting and receiving unit 23B. When the SD has been received (Yes at Step S21), the signal processing unit 22B further checks whether the SD has been relayed from the terminal-apparatus first system 21A (the signal processing unit 22A) that is operating as a master (Step S22). When the SD has been relayed from the terminal-apparatus first system 21A (Yes at Step S22), the signal processing unit 22B determines that an operation is performed normally and continues its operation (Step S24). Specifically, the signal processing unit 22B returns to Step S21 to wait for an SD to be transmitted. In contrast, when no SD has been relayed from the terminal-apparatus first system 21A (No at Step S22), i.e., when, as illustrated in FIG. 5, the signal processing unit 22B has received the SD from the braking device 13 although the terminal-apparatus first system 21A cannot receive the SD, the signal processing unit 22B determines that the receiving unit 25A of the transmitting and receiving unit 23A has failed in the terminal-apparatus first system 21A operating as a master and starts a transmission operation (generation and transmission of an SDR with respect to the braking device 13 and transmission of an SD (or data generated on the basis of the SD) in response to the request from the central apparatuses 11) (Step S23). In other words, the terminal-apparatus second system 21B starts operating as a master.

As described above, in the present embodiment, the terminal-apparatus first system 21A and the terminal-apparatus second system 21B of the terminal apparatus 12 mutually transmit a notification of the receipt of an SD from the braking device 13. The terminal-apparatus first system 21A or the terminal-apparatus second system 21B, whichever is operating as a master, determines whether its receiving unit has failed on the basis of the presence or absence of a notification from a slave and the reception state of an SD and, when a failure is detected, stops operating as a master. The terminal-apparatus first system 21A or the terminal-apparatus second system 21B, whichever is operating as a slave, determines whether the receiving unit of a master has failed on the basis of the presence or absence of a notification from the master and the reception state of an SD and, when a failure is detected, starts operating as a master.

Therefore, even when only the receiving unit of a master has failed, the failure is definitely detected and the system that operates as a master can be changed.

In the present embodiment, the terminal-apparatus first system 21A and the terminal-apparatus second system 21B of the terminal apparatus 12 mutually transmit a notification of the receipt of an SD from the braking device 13; however, the configuration may be such that one of the systems notifies the other system of the receipt of an SD. The following is an example of such an operation. A master system notifies a slave system of the receipt of an SD. When the slave system has received the SD from the braking device 13 and a notification from the master system (a notification of the receipt of the SD), the slave system determines that master system is normal. When the slave system does not receive a notification (a notification of the receipt of the SD) from the master system at the time of receipt of the SD from the braking device 13, the slave system determines that the master system has failed. When the slave system determines that the master system has failed, the slave system notifies the master system that a failure has been detected to cause the master system to stop operating as a master, and the slave system starts operating as a master. In contrast, in the case where a slave system notifies a master system of the receipt of an SD, the master system determines whether it has itself failed. When the master system detects a failure in itself, the master system stops operating as a master and instructs another system to start operating as a master.

Moreover, in the present embodiment, an explanation has been given of an operation of switching an operation (an operation of switching the system that is operating as a master) depending on whether a failure is detected in the receiving unit in the system that is operating as a master. A failure of the transmitting unit is detected by using existing methods. For example, when the terminal-apparatus first system 21A illustrated in FIG. 2 is a master, the receiving unit 25B of the terminal-apparatus second system 21B operating as a slave receives an SDR that is transmitted from the master to the braking device 13 and outputs the SDR to the signal processing unit 22B. When the signal processing unit 22B in the slave cannot receive the SDR (the SDR transmitted from the master side) over a fixed period of time, the signal processing unit 22B determines that the transmitting unit 24A in the master has failed. When a failure is detected, the operation is switched. Such a failure detection method is disclosed, for example, in Japanese Patent Application Laid-open No. 2000-224204.

An explanation has been given of a case where a device to be controlled is a braking device connected using a simplex system; however, a device to be controlled may be other devices connected using a simplex system.

When a predetermined condition is satisfied, the terminal apparatus 12 generates an SDR as a command signal and transmits the SDR to the braking device 13; however, a command signal transmitted to the braking device 13 or other devices to be controlled may be other than an SDR.

Moreover, an explanation has been give of a case where the terminal apparatus 12 is configured to have redundancy; however, the central apparatus 11 may be configured to have redundancy by applying similar configuration and control procedure. When the central apparatus 11 is configured to have redundancy (the central apparatus 11 is duplexed), upon receiving data from a device to be controlled or a terminal apparatus, the master system and the slave system mutually transmit a notification of the fact that the data has been received and each system detects a failure of the system that is operating as a master on the basis of the notification from the other system and the data reception result. A train information managing apparatus having a higher reliability than conventional technologies can be realized by at least one of the terminal apparatus 12 and the central apparatus 11 having redundancy.

INDUSTRIAL APPLICABILITY

As described above, the train information managing apparatus according to the present invention is useful as a train information managing apparatus that employs a redundant configuration and that switches an operation of a system operating as a master by accurately detecting a failure in the system.

REFERENCE SIGNS LIST 10a head car, 10b intermediate car, 11 central apparatus, 12 terminal apparatus, 13 braking device, 14 display, 21A terminal-apparatus first system, 21B terminal-apparatus second system, 22A, 22B signalprocessing unit, 23A, 23B transmitting and receiving unit, 24A, 24B, transmitting unit, 25A, 25B receiving unit 30 control command signal.

The invention claimed is:

1. A train information managing apparatus comprising:
   a terminal apparatus that communicates with a train-mounted device and is mounted on a train; and
   a central apparatus that communicates with the terminal apparatus and the train-mounted device and is mounted on a train, wherein
   in at least one of the terminal apparatus or the central apparatus, a processing system that includes a signal processing unit is duplicated, the signal processing unit generating a command signal for the train-mounted device and receiving a response signal made in response to the command signal, and
   at least one of the signal processing units that receive a response signal from the train-mounted device transmits, to another of the signal processing units, information indicating receipt of the response signal via a path that is different from a signal path to the train-mounted device so as to be used to determine a failure in one of the processing systems.

2. The train information managing apparatus according to claim 1, wherein
   when each of the signal processing units transmits a notification of receipt of the response signal to another of the signal processing units, each of the signal processing units determines a presence or absence of a failure in a processing system that includes a signal processing unit operating as a master, the determination being made on a basis of the response signal received from the train-mounted device and a result of receipt of the response signal by the another of the signal processing units, and
   when a failure is detected, the signal processing unit operating as a master stops operating as a master and a signal processing unit operating as a slave starts operating as a master.

3. The train information managing apparatus according to claim 1, wherein
   when a first signal processing unit that is among the signal processing units and is operating as a master transmits a notification of receipt of the response signal to another of the signal processing units, a second signal processing unit that is among the signal processing units and is operating as a slave determines a presence or absence of a failure in a processing system that includes the first signal processing unit, the determination being made on a basis of the response signal received from the train-mounted device and a result of receipt of the response signal by the first signal processing unit, and when a failure is detected, the second signal processing unit instructs the first signal processing unit to stop operating as a master and starts operating as a master.

4. The train information managing apparatus according to claim 1, wherein when a first signal processing unit that is among the signal processing units and is operating as a slave transmits a notification of receipt of the response signal to another of the signal processing units, a second signal processing unit that is among the signal processing units and is operating as a master determines a presence or absence of a failure in a processing system that includes the second signal processing unit, the determination being made on a basis of the response signal received from the train-mounted device and a result of receipt of the response signal by the first signal processing unit, and when a failure is detected, the second signal processing unit stops operating as a master and instructs the first signal processing unit to start operating as a master.

5. The train information managing apparatus according to claim 1, wherein each of the signal processing units is configured to designate itself as operating as at least one of a master or a slave in relation to another signal processing unit of the signal processing units and causing the other signal processing unit to operate as the corresponding slave or master.

6. The train information managing apparatus according to claim 1, wherein at least one of the signal processing unit that receives the response signal from the train-mounted device and the signal processing unit that receives the information indicating receipt of the response signal determines, based on at least one of the response signal or the information received, whether a failure occurs in the processing system that includes the signal processing unit that is operating as a master.

* * * * *